(12) United States Patent
Yoon et al.

(10) Patent No.: US 8,778,564 B2
(45) Date of Patent: Jul. 15, 2014

(54) UNIT CELL OF HONEYCOMB-TYPE SOLID OXIDE FUEL CELL, STACK USING THE UNIT CELL AND METHOD MANUFACTURING THE UNIT CELL AND STACK

(75) Inventors: Sung Pil Yoon, Seongnam-si (KR); Tae Hoon Lim, Seoul (KR); Seong Ahn Hong, Seoul (KR); In Hwan Oh, Seoul (KR); Suk-Woo Nam, Seoul (KR); Jonghee Han, Seoul (KR); Jong Pil Jeong, Hwasun-gun (KR); Kwang Soo Lee, Gwacheon-si (KR); Yeong Cheon Kim, Seoul (KR); Hyoung-Juhn Kim, Suwon-si (KR); Eun Ae Cho, Seoul (KR); Soo-Kil Kim, Seoul (KR); Sang Yeop Lee, Seoul (KR)

(73) Assignee: Korean Institute of Science and Technology, Seoul (KR)

( * ) Notice: Subject to any disclaimer, the term of this patent is extended or adjusted under 35 U.S.C. 154(b) by 752 days.

(21) Appl. No.: 12/560,572

(22) Filed: Sep. 16, 2009

(65) Prior Publication Data
US 2010/0203415 A1 Aug. 12, 2010

(30) Foreign Application Priority Data
Sep. 17, 2008 (KR) ................. 10-2008-0090965

(51) Int. Cl.
| | |
|---|---|
| *H01M 4/02* | (2006.01) |
| *H01M 4/36* | (2006.01) |
| *H01M 4/62* | (2006.01) |
| *H01M 8/24* | (2006.01) |
| *H01M 8/10* | (2006.01) |
| *H01M 4/64* | (2006.01) |
| *H01M 4/66* | (2006.01) |
| *H01M 8/00* | (2006.01) |

(52) U.S. Cl.
USPC ........... 429/532; 429/452; 429/465; 429/519; 429/535; 427/115

(58) Field of Classification Search
USPC ......... 429/465, 466, 452, 456, 532, 519, 535; 427/115
See application file for complete search history.

(56) References Cited

U.S. PATENT DOCUMENTS 4,129,685 A * 12/1978 Damiano ....................... 429/456
4,883,497 A * 11/1989 Claar et al. ................... 29/623.5
(Continued)

FOREIGN PATENT DOCUMENTS

| | | |
|---|---|---|
| JP | 10-189024 A | 7/1998 |
| JP | 11-297344 A | 10/1999 |
| KR | 1020050098420 A | 10/2005 |

(Continued)

OTHER PUBLICATIONS

Souza, Selmar de, et al., "Thin-Film solid oxide fuel cell with high performance at low-temperature," Solid State Ionics, 98, pp. 57-61 (1997).

*Primary Examiner* — Patrick Ryan
*Assistant Examiner* — Julian Anthony
(74) *Attorney, Agent, or Firm* — Sughrue Mion, PLLC (57) ABSTRACT

Disclosed is a unit cell of a honeycomb-type solid oxide fuel cell (SOFC) having a plurality of channels. The channels include cathode channels and anode channels. The cathode channels and anode channels are set up alternately in the unit cell. A collector is installed inside each of the cathode channels and the anode channels, and a packing material is packed into the channels having the collector. Disclosed also is a stack including the unit cells and methods for manufacturing the unit cell and the stack.

25 Claims, 3 Drawing Sheets

(56) References Cited

U.S. PATENT DOCUMENTS

| | | | |
|---|---|---|---|
| 5,935,725 A * | 8/1999 | Dhar et al. | 429/414 |
| 6,800,388 B2 * | 10/2004 | Kaneko et al. | 429/479 |
| 6,936,367 B2 * | 8/2005 | Sarkar et al. | 429/423 |
| 7,507,489 B2 * | 3/2009 | Toriyama | 429/425 |
| 2006/0051641 A1 * | 3/2006 | Toriyama | 429/30 |

FOREIGN PATENT DOCUMENTS

| | | |
|---|---|---|
| KR | 100534022 B1 | 11/2005 |
| KR | 100699074 B1 | 3/2007 |

* cited by examiner

UNIT CELL OF HONEYCOMB-TYPE SOLID OXIDE FUEL CELL, STACK USING THE UNIT CELL AND METHOD MANUFACTURING THE UNIT CELL AND STACK

This application claims priority to Korean Patent Application No. 10-2008-0090965, filed on Sep. 17, 2008, and all the benefits accruing therefrom under 35 U.S.C. §119, the contents of which in its entirety are herein incorporated by reference.

BACKGROUND

1. Field

This disclosure relates to a unit cell of honeycomb-type solid oxide fuel cell, a stack using the unit cell and methods for manufacturing the unit cell and the stack.

2. Description of the Related Art

In general, solid oxide fuel cells (SOFCs) may be classified into cylindrical SOFCs and planar SOFCs according to the shape of unit cells.

In case of a cylindrical SOFC, gas sealing may not be required but a high-cost process such as electrochemical vapor deposition (EVD) may be required. A cylindrical SOFC may have a large internal resistance due to a long current collection distance between both electrodes. In addition, due to a long distance from a reactive site to a collector, it may be difficult to obtain a high output density from a cylindrical SOFC as compared to a planar SOFC.

On the contrary, a planar SOFC can provide high cost efficiency due to the use of a wet process and show a short current collection distance. However, it may be difficult to perform gas sealing in a planar SOFC. A planar SOFC can provide a high internal resistance in a stack due to the non-uniformity in thickness from one unit cell to another unit cell.

Therefore, various types of SOFC unit cells and stack structures have been developed to overcome the above-mentioned shortcomings of cylindrical or planar SOFCs, to improve quality of SOFCs, and to downsize SOFCs.

Typical examples of such SOFCs may include anode-supported SOFCs or honeycomb-type SOFCs that enables thinning of electrolytes up to 10 μm or less.

SUMMARY

There can be provided a unit cell of a honeycomb-type solid oxide fuel cell (SOFC) that enables effective and easy current collection, facilitates stacking and sealing and allows for direct reforming of a fuel within channels in a high-quality, particularly portable or compact honeycomb-type SOFC, as well as a stack using the unit cell and a method for manufacturing the unit cell and the stack.

Disclosed herein is in an exemplary embodiment a unit cell of a honeycomb-type SOFC having a plurality of channels. The channels may include cathode channels and anode channels, the cathode channels and anode channels are set up alternately in the unit cell, a collector is installed inside each of the cathode channels and the anode channels, and a packing material is packed into the channels having the collector.

Disclosed herein is in an exemplary embodiment a honeycomb-type SOFC stack including the unit cells.

Disclosed herein is in an exemplary embodiment a method for manufacturing a unit cell of a honeycomb-type SOFC having a plurality of channels. The method may include providing channels comprising cathode channels and anode channels, the cathode channels and anode channels being set up alternately in the unit cell, installing a collector inside each of the cathode channels and the anode channels, and packing a packing material into the channels having the collector.

Disclosed herein is in an exemplary embodiment a method for manufacturing a stack of a honeycomb-type SOFC including making the unit cell and stacking a plurality of the unit cells to obtain the stack.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

This disclosure will now be described more fully hereinafter with reference to the accompanying drawings, in which exemplary embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the claims to those skilled in the art. Like reference numerals refer to like elements throughout. Further, the shape, size and regions, and the like, of the drawings may be exaggerated for clarity.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings herein.

The terminology used herein is for the purpose of describing particular embodiments only and is not intended to limit the claims. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of this disclosure will be described in detail with reference to the accompanying drawings.

All methods described herein can be performed in a suitable order unless otherwise indicated herein or otherwise clearly contradicted by context. The use of any and all examples, or exemplary language (e.g., "such as"), is intended merely for illustration and does not pose a limitation on the scope of the claims unless otherwise claimed. No language in the specification should be construed as indicating that any non-claimed element is essential.

Figure 1:
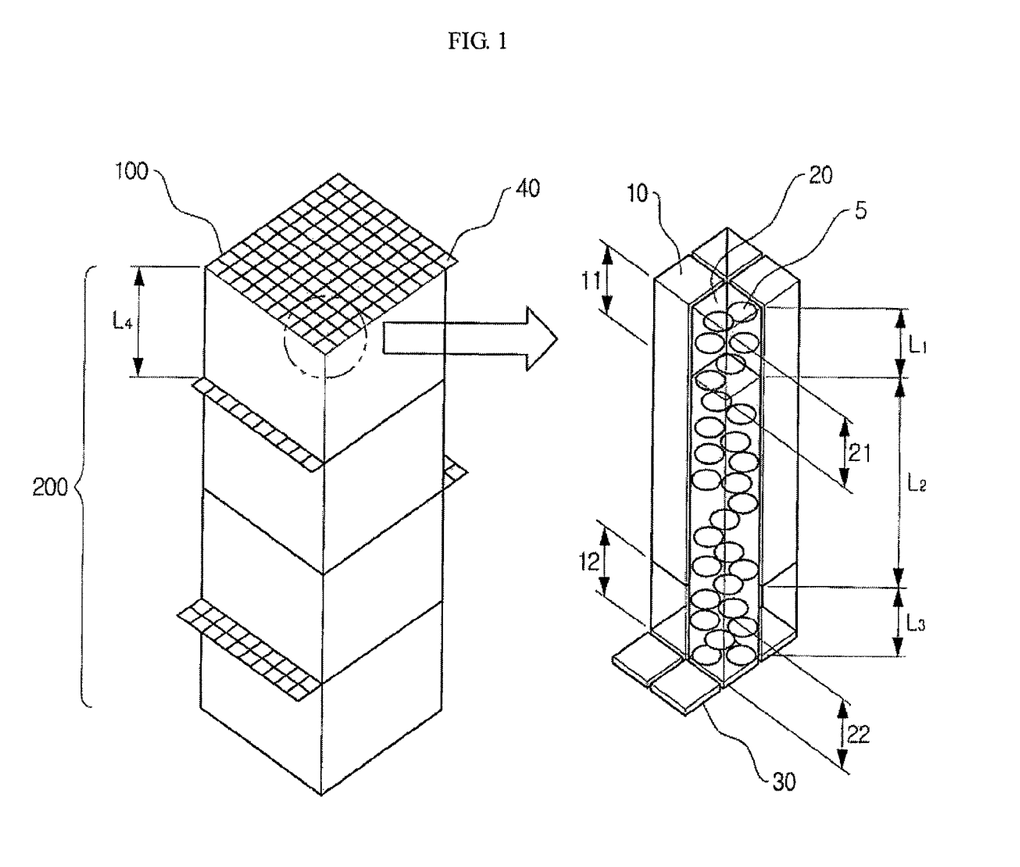
FIG. 1 is a schematic view showing the unit cell and stack of a honeycomb-type solid oxide fuel cell (SOFC) according to one embodiment.

FIG. 1 is a schematic view showing the unit cell and stack of a honeycomb-type solid oxide fuel cell (SOFC) according to one embodiment.

Referring to FIG. 1, the unit cell of the honeycomb-type SOFC 100 according to one embodiment may include a plurality of channels. The channels may include cathode channels 10 where cathode are formed therein (length: L4) and anode channels 20 where anode are formed therein (length: L4), and the cathode channels 10 and anode channels 20 may be set up alternately within the unit cell.

The cathode channels 10 may have a front end 11 (length: L1) and a rear end 12 (length: L3). Similarly, the anode channels 20 may have a front end 21 (length: L1) and a rear end 22 (length: L3). The front end 11 and the rear end 12 of the cathode channels 10 can be made to face the front end 21 and the rear end 22 of the anode channels 20, respectively.

Herein, no cathode may be formed at the rear end 12 of the cathode channels 10 and no anode may be formed at the front end 21 of the anode channels 22 so as to prevent a short-circuit between the cathode and the anode.

For the similar purpose, it is also possible that no cathode is formed at the front end 11 of the cathode channels 10 and no anode is formed at the rear end 22 of the anode channels 20. For reference, the total length (length: L4) of the unit cell 100 equals to the sum of the length (length: L1) of the front end, length (length: L3) of the rear end and length (length: L2) of the middle part of each electrode channel.

Each collector net 30 and 40 may be installed inside the cathode channels 10 and the anode channels 20. The collector nets 30 and 40 may be drawn from the corresponding channels and extend from the unit cell 100 toward the opposite directions with each other.

To facilitate current collection, the packing material as described hereinafter, such as a spherical or ellipsoidal bead-like packing material 5, may be packed into each of the cathode channels 10 and the anode channels 20. The use of the packing material within each electrode channel may help current collection in each electrode channel. Herein, when the packing material is further coated with a reforming catalyst, reforming may be further carried out together with current collection.

A plurality of cathode channels 10 can be set up alternately with a plurality of anode channels 20 to provide the unit cell 100. Such unit cells 100 may be stacked successively to form a stack 200.

Hereinafter, methods for manufacturing the unit cell of a honeycomb-type SOFC and for forming a stack using the same will be explained in more detail.

First, a molding material may be extrusion-molded to obtain a main body framework of the unit cell of honeycomb-type SOFC having a plurality of channels formed repeatedly therein. Then, the main body framework may be baked to obtain a compact honeycomb-type molded body.

The molding material that may be used herein include: an electrolyte material, such as yttria-stabilized zirconia (YSZ), samaria doped ceria (SDC), gadolinia doped ceria (GDC), lanthanum strontium doped gallate (LSG), lanthanum strontium doped gallate magnesite (LSGM) or the like; at least one cermet used as an anode material, selected from the group consisting of Ni/YSZ, Ni/SDC, Ni/GDC, Cu/YSZ, CuO/SDC and Cu/GDC; or at least one composite oxide used as a cathode material, selected from the group consisting of $(La_{1-x}Sr_x)MnO_3$/YSZ (wherein x is 0.5 or less), $(La_{1-x}Ca_x)MnO_3$/YSZ (wherein x is 0.5 or less), $(La_{1-x}Sr_x)CoO_3$/SDC (wherein x is 0.6 or less) and $(La_{1-x}Sr_x)(Co_{1-y}Fe_y)O_3$/SDC (wherein x is 0.4 or less and y is 0.8 or less).

In the channels of the honeycomb-type molded body, every second channel may be masked and the non-masked channel may be coated with anode slurry or cathode slurry, thereby forming anodes or cathodes on the corresponding channels. Herein, the front end of the anode channel and the rear end of the cathode channel, or the rear end of the anode channel and the front end of the cathode channel may be masked using a tape or others to form a space having no anode or cathode. As described above, making the space without anode or cathode is to prevent a short-circuit between the anode and the cathode.

The anode material that may be used herein includes at least one cermet selected from the group consisting of Ni/YSZ, Ni/SDC, Ni/GDC, Cu/YSZ, Cu/SDC and Cu/GDC. The anode material may be formed into slurry, and the slurry may be coated several times to a desired thickness to form an electrode, followed by drying and baking.

The cathode material that may be used herein includes at least one metal or oxide selected from the group consisting of Pt, Ag, Au, Rh, Ir, Pd, Ru, $(La_{1-x}Sr_x)MnO_3$ (wherein x is 0.5 or less), $(La_{1-x}Ca_x)MnO_3$ (wherein x is 0.5 or less), $(La_{1-x}Sr_x)CoO_3$ (wherein x is 0.6 or less) and $(La_{1-x}Sr_x)(Co_{1-y}Fe_y)O_3$ (wherein x is 0.4 or less and y is 0.8 or less). The cathode material may be formed into slurry, and the slurry may be coated several times to a desired thickness to form an electrode, followed by drying and baking.

After that, collectors that may be formed of platinum can be inserted into each of the anodes and the cathodes in the channels of the unit cell obtained as described above. Then, the collectors may be drawn from the unit cell in such a manner that they extend from the unit cell to the opposite directions with each other.

Preferably, the collector may be a metal net. More preferably, the metal may be Pt, Ag, Au, Ni, Cu or alloys thereof in view of the collection efficiency.

For reference, an organic binder can be used to perform binding of the collector within the channel. The organic binder may be a polymeric binder capable of being removed easily upon heat treatment.

Figure 2:
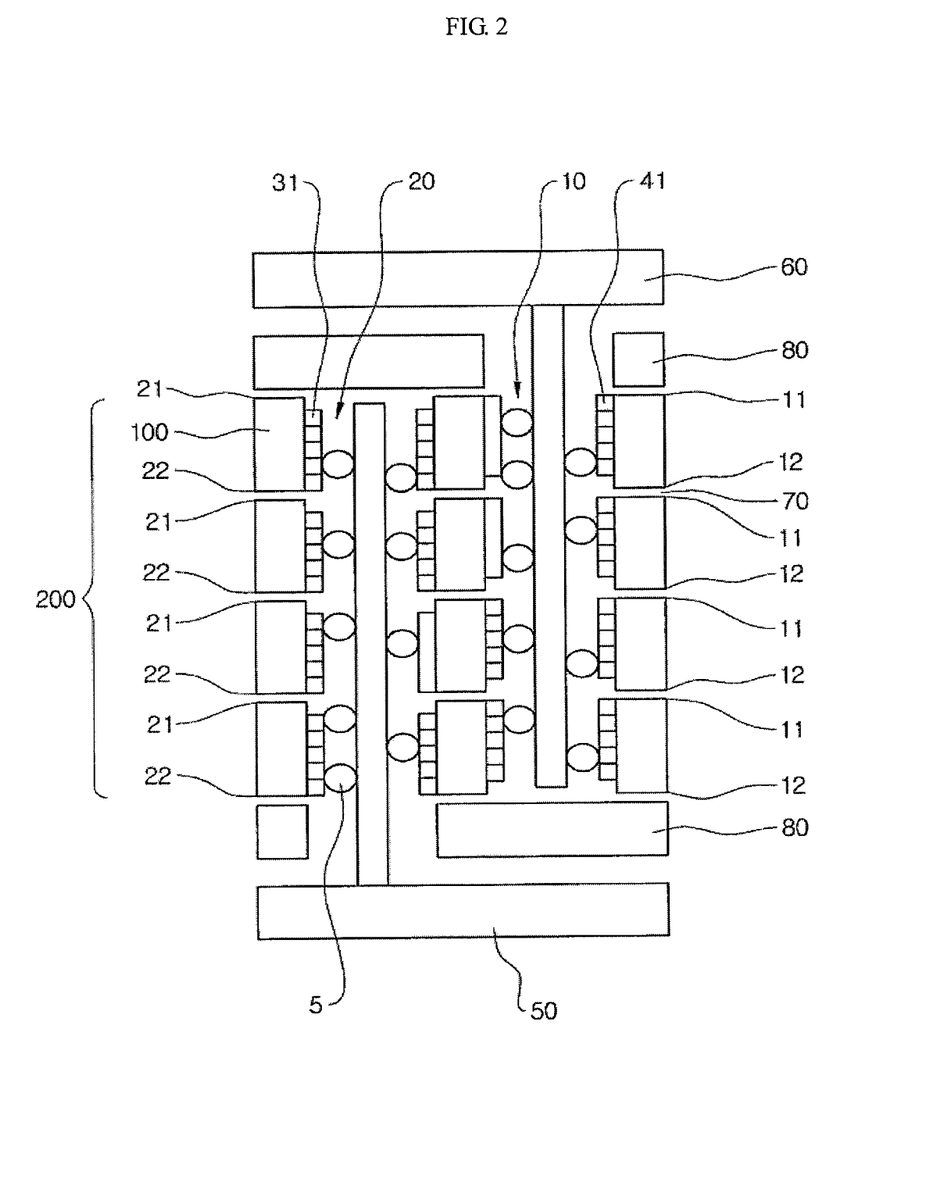
FIG. 2 is a schematic view showing the section of a honeycomb-type SOFC stack according to one embodiment, along with a fuel inlet and an air inlet.

FIG. 2 is a schematic view showing the section of a honeycomb-type SOFC stack according to one embodiment, along with a fuel inlet and an air inlet.

Referring to FIG. 2, to form a stack 200, a plurality of honeycomb-type SOFC unit cells 100 may be stacked successively in such a manner that the anode channels 20 and the cathode channels 10 are aligned. In addition, a fuel inlet 50 and an air inlet 60 can be formed around the stack, wherein each inlet is inserted into the anode channels 20 and the cathode channels 10.

Each collector net 31 and 41 may be formed inside each channel. Each channel may be also packed with a packing material, such as a bead-like material 5, as mentioned above.

A linker 70 may be used between one unit cell and another unit cell in the stack. Preferably, the linker that may be used herein may include metal, such as Pt, Ag, Au, Ni, Cu or alloys thereof, in order for the linker to perform electric connection. More preferably, glass may be used in combination with the metal linker to perform gas sealing together with electric connection. Preferably, the glass that may be used herein have a heat expansion coefficient equal or similar to the heat expansion coefficient of the honeycomb-type SOFC main body.

Meanwhile, each end of the anode channels and cathode channels stacked successively in a finished stack can be protected with a block 80 to form a dead end. Herein, the block may be formed of a material, such as alumina, zirconia, YSZ or SDC, having a heat expansion coefficient equal or similar to the heat expansion coefficient of the honeycomb-type SOFC main body.

Then, as shown in FIG. 2, the air inlet 60 and the fuel inlet 50 may be inserted into the honeycomb-type SOFC stack channels. The bead-like packing material may help current collection and allow the fuel inlet and the air inlet to be fixed in the channels. Herein, after the air inlet and the fuel inlet are inserted into the cathode channels and the anode channels, respectively, the bead-like packing material may be introduced into the channels to which the inlets are inserted.

The beads may be at least one oxide beads selected from the group consisting of alumina beads, zirconia beads, YSZ beads, SDC beads and glass beads having a heat expansion coefficient equal or similar to the heat expansion coefficient of the honeycomb-type SOFC main body. The beads may be spherical or ellipsoidal beads to ensure porosity.

Meanwhile, to make the obtainment of porosity easy, the packing material may have a shape other than a spherical or ellipsoidal shape. Besides the spherical or ellipsoidal beads, chain- or whisker-shaped beads may be used as the packing material. Furthermore, when the packing material is used in combination with a pore forming agent, such as graphite, the pore ratio can increase, thereby securing porosity more easily. Such securing porosity may induce smooth gas diffusion so that the air and fuel gas flow may be facilitated in the electrode channels.

Further, as mentioned above, when the packing material is coated with a catalyst suitable for fuel reforming on the surface thereof, reforming may be performed together with current collection.

Figure 3:
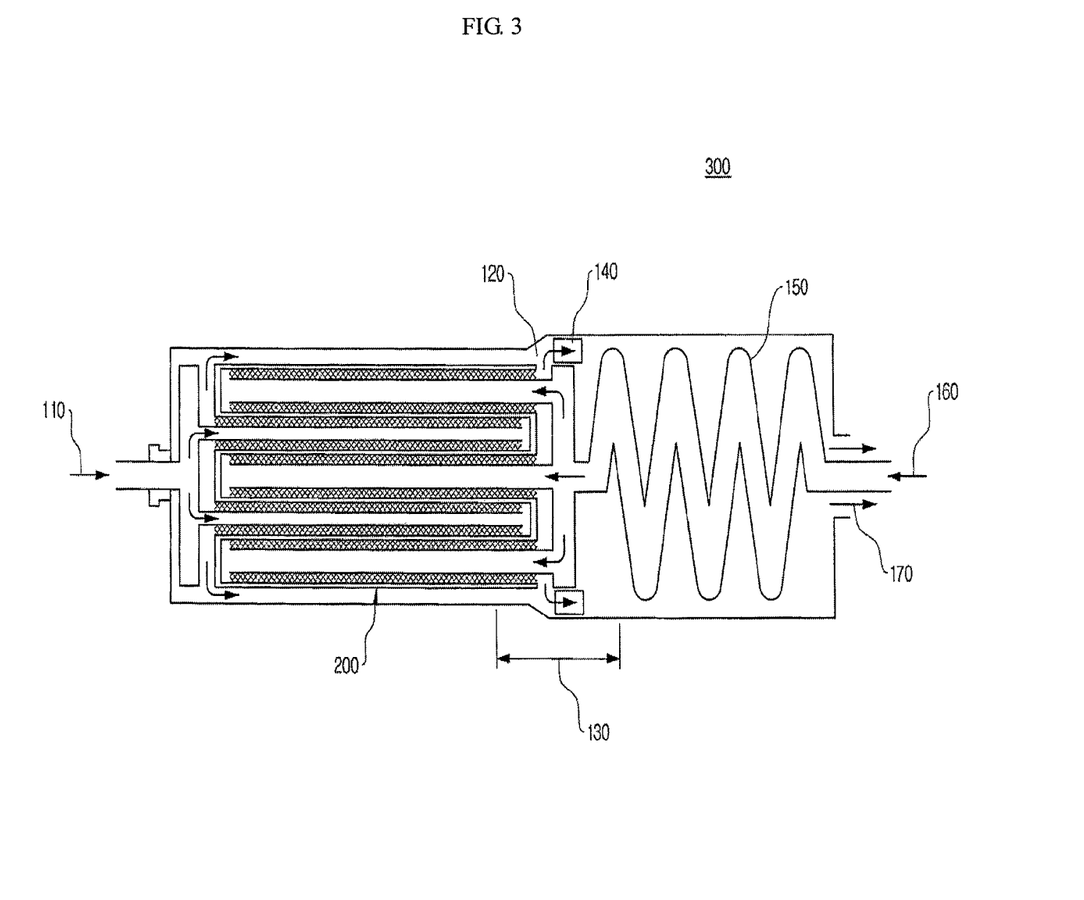
FIG. 3 is a schematic view showing one embodiment of the portable or compact honeycomb-type SOFC system including the honeycomb-type SOFC stack according to one embodiment.

FIG. 3 is a schematic view showing one embodiment of the portable or compact honeycomb-type SOFC system including the honeycomb-type SOFC stack according to one embodiment.

Referring to FIG. 3, fuel and air may be supplied to the fuel cell system 300 including the stack 200 (as shown by 110 and 160). The fuel cell system 300 may include a heat exchanger 150. The unreacted fuel and oxygen 120 remaining in each anode and cathode may be subjected to complete combustion in a catalyst combustion device 140 before they are discharged 170, as shown in FIG. 3. The fuel cell system 300 may have a heating zone in a region around the catalyst combustion device 14.

The examples will now be described. The following examples are for illustrative purposes only and not intended to limit the scope of this disclosure.

EXAMPLE 1

First, YSZ powder (Tosoh Corporation, Japan) is formed into a paste and the paste is extrusion-molded to obtain a plurality of repeated channels 10 and 20, thereby providing a main body of unit cell of honeycomb-type SOFC. The molded body is baked at 1,500° C. for 2 hours to obtain a compact honeycomb-type molded body having a theoretical density of at least 98%.

Every second channel 10 of the honeycomb-type YSZ molded body is masked with glue and the non-masked open channels 20 are coated with NiO/YSZ slurry to form anodes.

The front ends 21 of the anode channels are masked with a tape or others so as to provide a space with a dimension of about 0.2 cm having no electrode and to prevent a short-circuit between the anodes and the cathodes (front ends 11 of the cathode channels). For example, the anode slurry may be coated twice or three times to obtain anodes with a desired thickness. Then, the anodes are dried and baked at 1,300° C. for 2 hours.

After forming the anodes, the anode channels 20 are masked with glue or others, and the non-masked remaining channels 10 are coated with LSM/YSZ slurry several times to obtain cathodes with a desired thickness. Herein, the rear ends 12 (about 0.2 cm) of the cathode channels are masked with a tape or others so as to provide a space having no electrode and to prevent a short-circuit between the anodes (rear ends 22 of the anode channels) and the cathodes.

Then, the cathodes are dried and baked at 1,100° C. for 2 hours to provide a honeycomb-type SOFC unit cell 100.

Meanwhile, platinum (Pt) net is inserted into each channel of the unit cell 100 as an anode collector or a cathode collector. The collector nets 30 and 40 are drawn from the unit cell 100 in such a manner that they extend from the unit cell to the opposite directions with each other.

The honeycomb-type SOFC unit cells 100 obtained as described above are stacked successively in such a manner that the anode channels and the cathode channels are aligned. Herein, a Pt foil is used as a linker 70 for the unit cells 100.

Then, zirconia blocks 80 are installed in the stack 200, in such a manner that the last channel portion in the stack, at the side opposite to the fuel inlet or air inlet forms a dead end, to finish the stack.

Next, as shown in FIG. 2, each of the fuel inlet 50 and air inlet 60 is inserted into each channel of the honeycomb-type SOFC stack. Then, zirconia beads 5 are packed therein to facilitate current collection and to fix the fuel inlet 50 and air inlet 60.

Herein, the surface of the zirconia beads is coated with a commercially available catalyst with low conductivity suitable for partial oxidation (POX) of methane.

Meanwhile, the honeycomb-type SOFC stack 200 may be used to manufacture a portable or compact honeycomb-type SOFC system 300, for example, as described above with reference to FIG. 3.

EXAMPLE 2

First, NiO/YSZ powder (Tosoh Corporation, Japan) is mixed with graphite powder as a pore forming agent in an adequate ratio to form a paste and the paste is extrusion-molded to obtain a plurality of repeated channels 10 and 20, thereby providing a main body of unit cell of honeycomb-type SOFC. The molded body is baked at 1,200° C. for 3 hours to obtain a porous honeycomb-type molded body.

In the molded body, every second channel 10 is masked with glue and the non-masked open channels 20 are coated with YSZ electrolyte slurry. The anode slurry is dried and baked at 1,400° C. for 2 hours to form a thin-film type dense electrolyte having a thickness of about 10 μm.

Then, the anode channels 20 are masked with glue or others and the remaining non-masked open channels 10 are coated with LSM (praxair, USA)/YSZ slurry several times to form cathodes. The cathode slurry is coated twice or three times to obtain cathodes with a desired thickness. Then, the cathodes are dried and baked at 1,100° C. for 2 hours.

Herein, the rear ends (about 0.2 cm) of the cathode channels and the front ends (about 0.2 cm) of the anode channels are masked with a tape or others so as to provide a space having no electrode and to prevent a short-circuit between the anodes and the cathodes.

Then, collector nets 30 and 40 formed of Ni or Inconel 600 are inserted into each channel of the unit cell 100 as an anode collector or a cathode collector. The collector nets 30 and 40 are drawn from the unit cell 100 in such a manner that they extend from the unit cell to the opposite directions with each other. The honeycomb-type SOFC unit cells 100 obtained as described above are stacked successively in such a manner that the anode channels and the cathode channels are aligned. Herein, silver (Ag) foil is used as a linker 70 for the unit cells 100.

Then, alumina blocks 80 are installed in the stack 200, in such a manner that the last channel portion in the stack, at the side opposite to the fuel inlet or air inlet forms a dead end, to finish the stack.

Next, as shown in FIG. 2, each of the fuel inlet 50 and air inlet 60 is inserted into each channel of the honeycomb-type SOFC stack. Then, alumina beads 5 are packed therein to facilitate current collection and to fix the fuel inlet 50 and air inlet 60.

Herein, the surface of the alumina beads is coated with a commercially available catalyst with low conductivity suitable for partial oxidation (POX) of methane.

Meanwhile, the honeycomb-type SOFC stack 200 may be used to manufacture a portable or compact honeycomb-type SOFC system 300, for example, as described above with reference to FIG. 3.

EXAMPLE 3

First, LSM (praxair, USA)/YSZ powder (Tosoh Co., Japan) is mixed with graphite powder as a pore forming agent in an adequate ratio to form a paste and the paste is extrusion-molded to obtain a plurality of repeated channels 10 and 20, thereby providing a main body of unit cell of honeycomb-type SOFC. The molded body is baked at 1,200° C. for 3 hours to obtain a porous honeycomb-type molded body.

In the molded body, every second channel 20 is masked with glue and the non-masked open channels 10 are coated with YSZ electrolyte slurry. The slurry is dried and baked at 1,400° C. for 2 hours to form a thin-film type dense electrolyte having a thickness of about 10 μm.

Then, the cathode channels 10 are masked with glue or others and the remaining non-masked open channels 20 are coated with NiO/YSZ slurry several times to form anodes. The anode slurry is coated twice or three times to obtain anodes with a desired thickness. Then, the anodes are dried and baked at 1,100° C. for 2 hours.

Herein, the rear ends (about 0.2 cm) of the cathode channels and the front ends (about 0.2 cm) of the anode channels are masked with a tape or others so as to provide a space having no electrode and to prevent a short-circuit between the anodes and the cathodes.

Then, collector nets 30 and 40 formed of Ni or gold (Au) are inserted into each channel of the unit cell 100 as an anode collector or a cathode collector. The collector nets 30 and 40 are drawn from the unit cell 100 in such a manner that they extend form the unit cell to the opposite directions with each other. The honeycomb-type SOFC unit cells 100 obtained as described above are stacked successively in such a manner that the anode channels and the cathode channels are aligned. Herein, Au foil is used as a linker 70 for the unit cells 100. Alumina-silica based glass having a similar heat expansion coefficient to the honeycomb-type SOFC main body is further used to perform gas sealing.

Then, alumina blocks 80 are installed in the stack 200, in such a manner that the last channel portion in the stack, at the side opposite to the fuel inlet or air inlet forms a dead end, to finish the stack.

Next, as shown in FIG. 2, each of the fuel inlet 50 and air inlet 60 is inserted into each channel of the honeycomb-type SOFC stack. Then, alumina beads 5 are packed therein to facilitate current collection and to fix the fuel inlet 50 and air inlet 60.

Herein, the surface of the alumina beads is coated with a commercially available catalyst with low conductivity suitable for partial oxidation (POX) of methane.

Meanwhile, the honeycomb-type SOFC stack 200 may be used to manufacture a portable or compact honeycomb-type SOFC system 300, for example, as described above with reference to FIG. 3.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof.

Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A unit cell of a honeycomb-type solid oxide fuel cell (SOFC) comprising
    a plurality of channels, the channels comprising cathode channels and anode channels, the cathode channels and anode channels being set up alternately in the unit cell;
    a collector being installed inside each of the cathode channels and the anode channels; and
    a packing material packed in an inner space of the channels having the collector, a part of the packing material being in contact with the collector.

2. The unit cell according to claim 1, wherein the packing material is coated with a reforming catalyst.

3. The unit cell according to claim 1, wherein the packing material has a spherical or ellipsoidal bead-like shape, or a chain- or whisker-like shape.

4. The unit cell according to claim 1, wherein the packing material is at least one selected from the group consisting of alumina, zirconia, YSZ, SDC and glass having a heat expansion coefficient equal to the heat expansion coefficient of a material forming a framework of the honeycomb-type SOFC unit cell.

5. The unit cell according to claim 1, wherein a pore forming agent is included inside the channels in addition to the packing material.

6. The unit cell according to claim 1, wherein a front end or rear end of the cathode channel has a space have no cathode, a rear end or front end of the anode channel has a space having no anode.

7. The unit cell according to claim 1, wherein the collector is a metal net.

8. The unit cell according to claim 7, wherein the metal is Pt, Ag, Au, Ni or Cu, or an alloy thereof.

9. The unit cell according to claim 4, wherein the material forming the framework of the unit cell is at least one selected from the group consisting of yttria-stabilized zirconia (YSZ), samaria doped ceria (SDC), gadolinia doped ceria (GDC), lanthanum strontium doped gallate (LSG) and lanthanum strontium doped gallate magnesite (LSGM); at least one cermet selected from the group consisting of Ni/YSZ, Ni/SDC, Ni/GDC, Cu/YSZ, CuO/SDC and Cu/GDC; or at least one composite oxide selected from the group consisting of $(La_{1-x}Sr_x)MnO_3$/YSZ (wherein x is 0.5 or less), $(La_{1-x}Ca_x)MnO_3$/YSZ (wherein x is 0.5 or less), $(La_{1-x}Sr_x)CoO_3$/SDC (wherein x is 0.6 or less), and $(La_{1-x}Sr_x)(Co_{1-y}Fe_y)O_3$/SDC (wherein x is 0.4 or less and y is 0.8 or less).

10. The unit cell according to claim 1, wherein the anode material is at least one cermet selected from the group consisting of Ni/YSZ, Ni/SDC, Ni/GDC, Cu/YSZ, Cu/SDC and Cu/GDC.

11. The unit cell according to claim 1, wherein the cathode material is at least one metal or oxide selected from the group consisting of: Pt; Ag; Au; Rh; Ir; Pd; Ru; $(La_{1-x}Sr_x)MnO_3$ (wherein x is 0.5 or less); $(La_{1-x}Ca_x)MnO_3$ (wherein x is 0.5 or less); $(La_{1-x}Sr_x)CoO_3$ (wherein x is 0.6 or less); and $(La_{1-x}Sr_x)(Co_{1-y}Fe_y)O_3$ (wherein x is 0.4 or less and y is 0.8 or less).

12. A honeycomb-type SOFC stack comprising a plurality of the unit cells according to claim 1.

13. The honeycomb-type SOFC stack according to claim 12, wherein a linker is interposed between unit cells.

14. The honeycomb-type SOFC stack according to claim 13, wherein the linker is a metallic linker alone or in combination with glass.

15. The honeycomb-type SOFC stack according to claim 12, wherein the stack is formed by stacking the plurality of unit cells in such a manner that the cathode channels and the anode channels are aligned, and comprises an air inlet and a fuel inlet inserted into the cathode channels and the anode channels.

16. The honeycomb-type SOFC stack according to claim 15, wherein blocks are formed at one end of the stack opposite to a portion into which the fuel inlet is inserted and at another end of the stack opposite to a portion into which the air inlet is inserted, and each block closes the channels.

17. The honeycomb-type SOFC stack according to claim 16, wherein the block comprises a material selected from alumina, zirconia, YSZ and SDC having a heat expansion coefficient equal to the heat expansion coefficient of a material forming a framework of the honeycomb-type SOFC unit cell.

18. A method for manufacturing a unit cell of a honeycomb-type solid oxide fuel cell having a plurality of channels, comprising:
    providing channels comprising cathode channels and anode channels, the cathode channels and anode channels being set up alternately in a unit cell;
    installing a collector inside each of the cathode channels and the anode channels; and
    packing a packing material into an inner space of the channels having the collector,
    wherein a part of the packing material being in contact with the collector.

19. The method according to claim 18, wherein a front end or rear end of the cathode channel and a rear end or front end of the anode channel are masked when forming the cathodes and the anodes inside the channels, so that the masked portions have no electrode.

20. A method for manufacturing a stack of a honeycomb-type solid oxide fuel cell, comprising:
    making a unit cell having a plurality of channels by providing channels comprising cathode channels and anode channels, the cathode channels and anode channels being set up alternately in the unit cell;
    installing a collector inside each of the cathode channels and the anode channels;
    packing a packing material into an inner space of the channels having the collector; and
    stacking a plurality of the unit cells to obtain the stack,
    wherein a part of the packing material being in contact with the collector.

21. The method according to claim 20, wherein a front end or rear end of the cathode channel and a rear end or front end of the anode channel are masked when forming the cathodes and the anodes inside the channels, so that the masked portions have no electrode.

22. The method according to claim 20, wherein the unit cells are stacked with a linker interposed between unit cells.

23. The method according to claim 22, wherein the linker is a metallic linker alone or in combination with glass.

24. The method according to claim 20, wherein an air inlet and a fuel inlet are inserted into the cathodes and the anodes, respectively, and then the packing material is packed into the channels to which the inlets are inserted.

25. The method according to claim 24, wherein a portion of the stack opposite to the air inlet and another portion of the stack opposite to the fuel inlet are closed after the stacking.

* * * * *